HYDROSTATIC TRANSMISSION
Filed Aug. 12, 1964
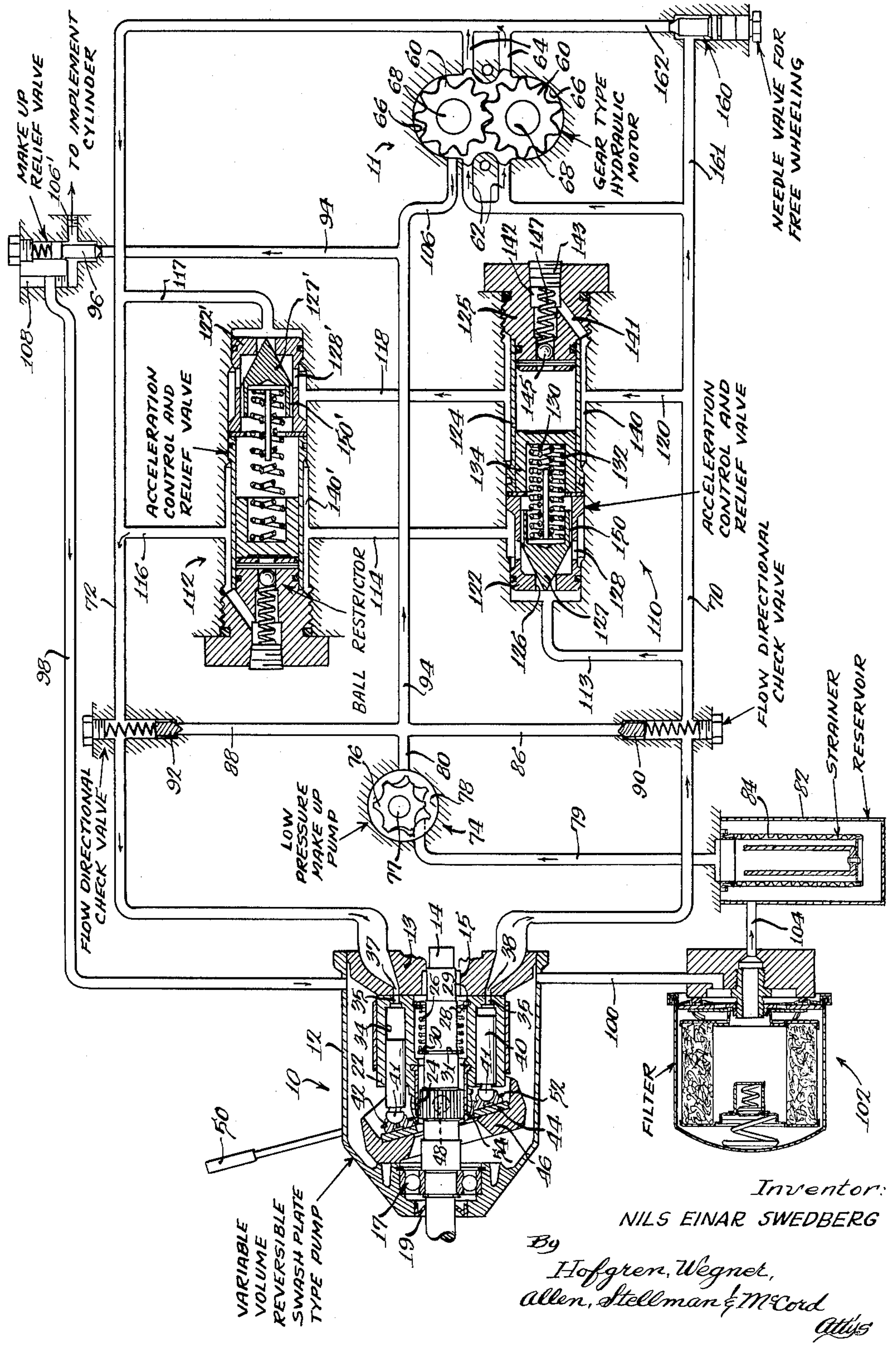
Inventor:
NILS EINAR SWEDBERG
By
Hofgren, Wegner,
Allen, Stellman & McCord
Att'ys United States Patent Office 3,253,411
Patented May 31, 1966

3,253,411
HYDROSTATIC TRANSMISSION

Nils E. Swedberg, Rockford, Ill., assignor to Sundstrand Corporation, a corporation of Illinois
Filed Aug. 12, 1964, Ser. No. 389,073
18 Claims. (Cl. 60—53)

This invention relates to hydrostatic transmissions and particularly transmissions suited for use as propulsion means for vehicles and the like and especially for relatively small vehicles such as garden or home tractors.

It is a general object of the invention to provide a new and improved transmission of simple, economical construction with provision for acceleration control.

Currently there are many relatively small tractors adapted for use around farms, homes, yards, gardens, streets and the like for purposes of propelling mowing, cultivating and snow plowing equipment. The present invention contemplates a transmission adapted for use in such tractors to propel the tractor including a motor having an output for driving propelling wheels or the like, and a pump for supplying fluid to drive the motor. The starting, stopping, acceleration and deceleration of the transmission is controlled by varying the displacement of the pump in one or both directions from neutral or zero displacement. While the hydraulic units embodied in the transmission may be made relatively small because of the relatively light loads contemplated, nevertheless they are relatively powerful to assure capacity for the work contemplated, and the transmission is capable of rapid acceleration, in the absence of controls, and since most of the vehicles concerned have provision for transporting a riding operator, such rapid acceleration may represent a hazard for the rider, tending to throw him off balance or even off the vehicle.

With the above considerations in mind, it is a more specific object of the invention to provide a new and improved hydrostatic transmission having valve means establishing a low pressure relief setting on the transmission upon initiating operation, thereby to limit the rate of acceleration.

A further object is to provide a new and improved transmission of the type described including means for disabling the low pressure setting of the relief valve means and establishing a high pressure setting after operation is under way.

Another object is to provide for a transmission of the type described a single valve providing both acceleration control during initial operation and high pressure relief after operation is under way including a relief valve member together with spring means normally establishing a low pressure setting on the valve member and means to establish a high pressure setting on the spring means.

An additional object is to provide an improved transmission of the type described with means to re-establish the low pressure setting on the valve on slowing the vehicle.

It is also an object of the invention to provide a reversible transmission with means of the type described limiting acceleration in both directions.

A further object is to provide means limiting deceleration in a transmission of the character mentioned.

Other objects and advantages will become readily apparent from the following detailed description taken in connection with the accompanyng drawing, in which:

The single figure is a diagrammatic illustration of a transmission embodying the principles of the present invention.

While an illustrative embodiment of the invention is shown in the drawing and will be described in detail herein, the invention is susceptible of embodiment in many different forms, and it should be understood that the present disclosure is to be considered as an exemplification of the principles of the invention and is not intended to limit the invention to the embodiment illustrated. The scope of the invention will be pointed out in the appended claims.

Referring now to the drawing in more detail, it illustrates a preferred embodiment of a hydrostatic transmission incorporating the principles of the present invention and including an axial piston, swashplate pump 10 and a gear motor 11 connected in a closed reversible hydraulic circuit so that the pump is adapted to deliver fluid under pressure to drive the motor in opposite directions, and the motor returns fluid to the pump.

As illustrated, the pump 10 preferably comprises a housing 12 having a port plate 13 at one end rotatably supporting a drive shaft 14 through the medium of suitable bearing means 15. The shaft 14 is supported at the opposite end of the housing by means of bearing 17 in the housing, and a shaft seal as at 19 prevents leakage along the shaft.

A rotatable cylinder block 22 is positioned in the housing 12 and has one end abutting the port plate 13. The cylinder block surrounds the central portion of the drive shaft and is suitably keyed or splined to the drive shaft as at 24 so that the cylinder block rotates with the shaft. A coiled compression spring 26 surrounds the shaft 14 and is positioned in a central recess in the cylinder block to bias the cylinder block toward the port plate, and for such purpose, one end of the spring bears against a spring seat 28 engaging a snap ring 29 retained in cylinder block, and the other end of the spring engages a collar 30 abutting a shoulder 31 on the shaft 14.

The cylinder block 22 is formed with an annular series of parallel axially disposed cylinders 34 each having an inlet and outlet port 35 adjacent the port plate 13 adapted to communicate successively with inlet and outlet ports 37 and 38 in the port plate 13 on rotation of the cylinder block. The porting 35, 37, 38 may be considered conventional for the purposes of this invention, and it will be understood that the ports 37 and 38 comprise a pair of arcuately shaped apertures disposed generally symmetrically on opposite sides of the plane of the drawing which may be described as the piston dead center plane, that is, the plane in which the pistons reach opposite ends of their strokes. As will appear, either of the ports 37 and 38 may function as an inlet port and the other as an outlet port.

The cylinders 34 each receive a reciprocable piston 40 having a spherical outer end portion 41, and the spherical ends 41 are positioned respectively in bearing shoes or slippers 42 engaging an annular face plate 44 rotatable on a swashplate 46. The swashplate 46 is suitably mounted for pivotal movement about a pivotal axis as at 48 normal to the axis of the shaft 14 and normal to the plane of the drawing so that the swashplate may be pivoted in opposite directions from a neutral, center, no-stroke position normal to the pistons as by means of a handle 50. The slippers 42 are preferably held against the face plate 44 by a retainer 52 having a central portion engaging the outer spherical surface 54 of a projection on the cylinder block.

It will be understood that the left end of the shaft 14 is adapted for connection with a suitable driving means such as an internal combustion engine adapted to rotate the shaft in a predetermined direction. With the swashplate 46 pivoted to the left as shown in the drawing, the pump is adapted to deliver fluid under pressure through the port 38 and to take fluid in through the port 37 as the cylinder block rotates. The swashplate may be pivoted over center toward the right to cause delivery of fluid under pressure through the port 37 to drive motor 11 in a reverse direction.

The motor 11 comprises a pair of pinion-like gears 60 with teeth thereon in mesh so that upon delivery of fluid under pressure through ports 62 the gears are caused to rotate, the upper one clockwise and the lower one counterclockwise, with fluid discharged through ports 64. The gears rotate respectively in appropriate cavities as at 66, and are suitably keyed respectively to shafts 68 from which output power may be taken as for driving a propelling mechanism for a vehicle or the like. It will be understood that if fluid is delivered under pressure through the ports 64, the gears are driven in opposite directions with fluid discharged through ports 62.

The pump and motor are connected in a closed hydraulic circuit including a conduit 70 connecting pump port 38 with motor ports 62 and a conduit 72 connecting pump port 37 with motor ports 64 so that the motor may be driven in either direction.

Charge pressure is maintained on the low pressure side of the closed hydraulic circuit and leakage fluid is replenished by a make-up pump 74 of a conventional gear type including an inner pinion-like gear 76 on a drive shaft 77 and meshing with an internal ring-like gear member 78. The shaft 77 is adapted to be driven by the same prime mover as that driving the main pump 10 so as to draw fluid through an intake passage 79 and deliver fluid to a passage 80. The passage 79 communicates with a reservoir 82 with a strainer 84 therein.

Delivery passage 80 communicates with branch passages 86 and 88 leading respectively to the main conduits 70 and 72 through spring biased check valves 90 and 92 respectively. The arrangement is such that fluid in the high pressure conduit of the conduits 70 and 72 (70 as illustrated) maintains the associated check valve (90 as illustrated) closed, and the pressure of fluid from the make-up pump opens the other check valve to deliver make-up fluid to the low pressure side of the circuit.

Make-up fluid in excess of that required for make-up and charge purposes flows through a passage 94 to a spring biased make-up relief valve 96 from which fluid flows through a passage 98 to the interior of the pump housing 12. The fluid flows from the pump housing 12 through a passage 100 to a filter apparatus 102, and from there through a passage 104 to the reservoir 82. Leakage fluid from the motor 11 flows through a passage 106 to the passage 94.

If desired, fluid may be taken from the make-up circuit over the relief valve 96 through an optionally plugged port 106′ for use in a suitable piston and cylinder device (not shown) for operating auxiliary equipment on the vehicle, and returned through an optionally plugged port 108.

In order to provide controlled acceleration and deceleration and high pressure relief, the circuit includes a pair of similar control valves 110 and 112, the first for controlling pressure in the conduit 70 and the second for controlling pressure in the conduit 72. For purposes of relieving pressure in the conduit 70, the valve 110 communicates with the conduit 70 through a passage 113 and communicates with the conduit 72 through a passage 114 so that high pressure fluid is relieved from the conduit 70 to the conduit 72. As illustrated, the passage 114 leads from the valve 110 across the valve 112, and a passage portion 116 leads from valve 112 to conduit 72. In similar fashion, a passage 117 leads from conduit 72 to valve 112, a passage 118 leads from valve 112 to valve 110 and a passage 120 leads from valve 110 to conduit 70. As will appear, passages 114, 116 and 118, 120, perform dual functions and fluid may flow in opposite directions in such passages.

The valve 110 comprises a housing means provided by a cup-shaped insert 122, a sleeve member 124 abutting the open end of the cup member 122 and piloted on the reduced end of a threadably mounted closure plug 125. The cup-shaped member 122 has a circular port 126 therethrough, the periphery of which provides an annular valve seat for receiving a conical or needle-shaped valve member 127 movable relative to the valve seat between valve closed and valve open positions. The port 126 communicates with passage 113 and, when the valve is open, the port 126 communicates with passage 114 through one or more ports 128 in the side wall of the cylindrical cup member.

The valve member 127 is urged toward valve closed position by a pair of coiled compression springs including an inner relatively weak spring 130, having a relatively long relaxed length, and an outer relatively strong spring 132, having a relatively short relaxed length, both of which seat against the bottom of a hollow piston 134 reciprocable in the sleeve 124 between the position illustrated and a position abutting the closure plug 125. When the piston 134 abuts the closure plug 125, the large spring 132 is uncompressed and the valve member 127 is urged toward the valve closed position illustrated with a relatively weak force establishing a low pressure setting on the valve member which may be on the order of 100 p.s.i., for example. When the piston 134 is positioned as illustrated, both springs urge the valve member 127 toward valve closed position with a much greater force establishing a high pressure setting on the valve member on the order of 2500 p.s.i., for example.

The piston 134 is adapted to be shifted from a position abutting closure plug 125 to the position illustrated by means of fluid under pressure from the conduit 70, flowing through passage 120 and through closure plug 125. More specifically, the passage 120 communicates with a chamber 140 surrounding the sleeve 124 and surrounding the reduced end portion of the plug 125, and the passage 141 in the closure plug connects the chamber 140 to a central bore 142 in the closure plug. The outer end of bore 142 is plugged by a closure 143, and a reduced inner end of bore 142 receives a ball restrictor 145 urged toward the piston 134 by a spring 147. The ball is retained in the plug 125 by a transverse pin or the like and is slightly smaller than the bore in which it is shown so that the fluid may flow past the ball to the back of the piston 134.

In operation, the piston 134 is normally seated against closure plug 125 so that the valve member 127 has a low pressure setting. When the pump swashplate 46 is moved from neutral toward the inclined position shown to deliver fluid through the conduit 70 to drive the motor, in a forward direction, for example, the relatively light spring force on the valve member 127 allows the valve member to open when the pressure in conduit 70 is about 100 p.s.i. so as to limit the rate at which the pressure can rise in the conduit 70 toward the desired operating level, about 2200 p.s.i., for example, so as to control the rate of acceleration of the vehicle driven by the transmission, thereby to limit jerky starts which might cause the operator to fall from the vehicle. At the same time, the piston 134 is gradually moved from the plug 125 toward the position illustrated. The restricted nature of the fluid flow past ball 145 provides for delayed and gradual movement of the piston 134 to the position illustrated to delay the maximum pressure setting on the relief valve. Ultimately, when the piston 134 reaches the position illustrated, the setting on the valve member 127 is on the order of 2500 p.s.i. Fluid flowing across the valve member 127 passes through passages 114 and 116 to the low pressure side of the circuit.

Without describing the valve 112 in detail, it should be understood that it is identical to the valve 110 and operates with reference to the conduit 72 as the valve 110 operates relative to conduit 70.

When the conduit 70 is pressurized, fluid in passage 120, chamber 140 and passage 118 flows into cup member 122′ of valve 112 through port 128′ and through grooves 150′ on valve member 127′ to act behind the valve member to maintain the latter in valve closed position.

With the transmission in operation and the vehicle in motion, it will be understood that if the pump swashplate 46 is moved toward neutral from the position illustrated, the pressure in conduit 70 will tend to drop, reducing the drive to motor 11, but since the vehicle has momentum, it tends to drive the motor 11 as a pump, raising the pressure in conduit 72 and tending to motor the pump 10, so that the prime mover brakes the vehicle. At that time, fluid under pressure in passage 116, the chamber 140', the passage 114, the port 128, and grooves 150 act against the piston 134, with springs 130 and 132, to return the piston toward the plug 125. In order to facilitate quick return of the piston, fluid behind the piston may move the ball restrictor 145 against the bias of spring 147 to a position where the ball encounters an enlarged intermediate bore portion which permits free flow of fluid toward the passages 141 and 120.

During braking, pressure increase in the conduit 72 is limited by valve 112 which at that time would initially have the low pressure setting established on valve member 127' thereby to limit deceleration to avoid sudden stops which might throw the operator from the vehicle. Depending on the weight and momentum of the vehicle, braking may be completed and the vehicle brought to a stop before the pressure increases in conduit 72 sufficiently to establish the high pressure setting on valve 112, or thereafter.

It will be understood that during acceleration and deceleration in a reverse direction, the valve 112 acts in a manner similar to that described in connection with the valve 110 for forward operation, and the valve 110 acts as described in connection with the valve 112 for forward operation.

In a preferred embodiment, the relationship of the ball restrictor 145 with a chamber which it supplies is such as to obtain a time delay on the order of four tenths of a second before the maximum pressure setting is attained. Obviously, the sensitivity of the valve, that is, the delay in attaining the maximum pressure setting may be varied by varying the degree of restriction afforded by the ball 145 relative to the size of the chamber it supplies.

In order to permit free wheeling of the vehicle so that it may be pushed about manually when desired, a needle valve or the like may be provided as at 160 for connecting a passage 161 and a passage 162. The passage 161 communicates with conduit 70 and the passage 162 communicates with conduit 72 in parallel with the passages through the motor 11. With this arrangement, when the vehicle is pushed, driving the motor 11 as a pump, the fluid pumped may be circulated through the manually openable needle valve without going through the pump, so that the vehicle may be easily pushed.

While the preferred embodiment of the transmission as described above includes two acceleration control and high pressure relief valves as at 110 and 112, it should be understood that it may be desirable to utilize only a single such valve apparatus, as for controlling only the forward motion of the vehicle. For example, if it is assumed that high pressure fluid in conduit 70 produces forward motion of the vehicle, the valve structure 110 may be retained and the valve structure 112 omitted. With such an arrangement, of course, passages 113, 114, 116 and 120 are necessary for proper operation of valve 110 while passages 117 and 118 would be unnecessary.

I claim:

1. In a hydrostatic transmission,
(a) a variable displacement pump,
(b) a motor,
(c) a conduit connecting the pump outlet and the motor inlet so that the pump delivers fluid to drive the motor,
(d) means for varying the displacement of the pump, (e) pressure relief valve means communicating with said conduit and operable in response to pressure increase in the conduit,
(f) means normally establishing a low pressure setting on the relief valve means to limit the rate of acceleration of the motor on increasing pump displacement from zero, and
(g) means responsive to pressure buildup in the conduit for disabling the low pressure setting and establishing a high pressure setting on the relief valve means after the motor is up to speed.

2. A combination as defined in claim 1, including,
(h) a conduit connecting the motor outlet and pump inlet so that fluid is returned from the motor to the pump,
(i) said pump displacement being variable in opposite directions from neutral, and
(j) means as in (e), (f) and (g) associated with the last recited conduit so that acceleration and deceleration are controlled in forward and reverse directions.

3. A combination as defined in claim 1, wherein
(h) the valve means comprises a valve seat and a valve member movable relative to the valve seat between valve closed and valve open positions,
(i) the means normally establishing a low pressure setting comprises a normally relatively uncompressed relatively weak spring biasing the valve member toward valve closed position, and
(j) the means for disabling the low pressure setting and establishing the high pressure setting comprises a normally uncompressed relatively strong spring, and a piston responsive to fluid pressure in said conduit and movable thereby to a position compressing said springs so that both urge the valve member toward valve closed position with relatively greater force than at the low pressure setting.

4. A combination as in claim 3, including,
(k) restricted passage means communicating said conduit and said piston so that the increase in pressure setting on the valve member is delayed and gradual relative to pressure increase in the conduit.

5. A combination as in claim 4, including,
(l) check valve means between said conduit and said piston openable toward the conduit to facilitate rapid piston return upon reduction in fluid pressure in said conduit when pump displacement is decreased.

6. A combination as in claim 3, including,
(l) a conduit connecting the motor outlet and pump inlet so that fluid is returned from the motor to the pump, and
(m) a relief passage connecting said conduits and including an inlet to said relief valve seat communicating with the first recited conduit and an outlet from the valve seat communicating with said last recited conduit.

7. A combination as in claim 6, including,
(n) a passageway connecting the valve outlet and a chamber in which said springs are located.

8. A combination as in claim 2, wherein,
(k) each valve means comprises a valve seat and a valve member movable relative to the valve seat between valve closed and valve open positions,
(l) each means normally establishing a low pressure setting comprises a normally relatively uncompressed relatively weak spring biasing the valve member toward valve closed position, and
(m) each means for disabling the low pressure setting and establishing the high pressure setting comprises a normally uncompressed relatively strong spring, and a piston responsive to fluid pressure in the associated conduit and movable thereby to a position compressing said springs so that both urge the valve member toward valve closed position with relatively greater force than at the low pressure setting.

9. A combination as in claim 8, including,
(n) restricted passage means communicating each conduit and its associated piston so that the increase in pressure setting on the valve member is delayed and gradual relative to pressure increase in the conduit.

10. A combination as in claim 8, including,
(n) a relief passage associated with each valve means connecting said conduits and including an inlet to said relief valve seat communicating with the conduit to be relieved and an outlet from the valve seat communicating with the other conduit.

11. A combination as in claim 10, including,
(o) a passageway connecting each valve outlet and a chamber in which the associated springs are located.

12. A combination as in claim 11, including,
(p) check valve means between each piston and the associated conduit openable toward the conduit to facilitate rapid piston return upon reduction in fluid pressure in said conduit when pump displacement is decreased.

13. In a hydrostatic transmission,
(a) a variable displacement pump,
(b) manual operable means for varying the displacement of the pump,
(c) a motor having a rotary output,
(d) a conduit connecting the pump outlet and the motor inlet so that the pump delivers fluid to drive the motor, and a conduit connecting the motor outlet with the pump inlet,
(e) pressure relief valve means communicating with each of said conduits and operable in response to pressure increase in the conduits,
(f) means normally establishing a low pressure setting on the relief valve means to limit the rate of acceleration and deceleration of the motor, and
(g) means for disabling the low pressure setting and establishing a high pressure setting on the relief valve means after the motor is up to speed during acceleration and after the motor is braked during deceleration, 14. A combined acceleration control and high pressure relief valve, comprising,
(a) a valve housing,
(b) a valve seat in the housing,
(c) a valve member movable in the housing relative to the valve seat between valve closed and valve open positions,
(d) means normally establishing a low pressure setting comprising a normally relatively uncompressed relatively weak spring biasing the valve member toward valve closed position, and
(e) means for disabling the low pressure setting and establishing a high pressure setting comprising a normally uncompressed relatively strong spring, and a piston movable by fluid pressure to a position compressing said springs so that both urge the valve member toward valve closed position with relatively greater force than at the low pressure setting.

15. A combination as in claim 14, including
(f) restricted passage means communicating with said piston for supplying fluid under pressure thereto at a controlled rate.

16. A combination as in claim 15, including,
(g) check valve means openable away from said piston to facilitate rapid piston return.

17. A combination as in claim 14, including,
(f) an inlet and an outlet in the valve housing communicating with the valve seat, and
(g) a passageway connecting the valve outlet and a chamber in which said springs are located.

18. In a hydrostatic transmission,
(a) a variable displacement pump,
(b) manually operable means for varying the displacement of the pump,
(c) a motor having a rotary output,
(d) a conduit connecting the pump outlet and the motor inlet so that the pump delivers fluid to drive the motor, and a conduit connecting the motor outlet and the pump inlet so that the motor returns fluid to the pump,
(e) pressure relief valve means operable in response to pressure increase in said conduits,
  (e-1) said pressure relief valve means including a valve chamber having a valve seat therein, and a valve member in said chamber movable relative to the valve seat between valve closed and open positions,
(f) a relief passage connecting said conduits and including an inlet passage to said relief valve seat communicating with the first recited conduit and an outlet from the valve seat communicating with said last recited conduit,
(g) means for establishing at least two pressure settings on the relief valve means to limit the rate of acceleration of the motor including a piston slidable in said chamber responsive to fluid pressure in said first recited conduit and movable thereby to urge the valve member toward the valve closed position with varying force,
(h) said piston being movable toward said valve member to increase the pressure setting of said relief valve means, and being movable away from said valve member to decrease the pressure setting of said relief valve means,
(i) and means for moving said piston away from said valve member and decreasing the pressure setting of said relief valve means upon an increase in pressure in the last recited conduit and a decrease in pressure in the first recited conduit including
  (i-1) a passageway connecting the valve outlet and said valve chamber.

References Cited by the Examiner

UNITED STATES PATENTS

| | | | |
|---|---|---|---|
| 1,902,972 | 3/1933 | Rouse | 60—53 |
| 2,280,291 | 4/1942 | Jaseph | 60—52 X |
| 3,114,424 | 12/1963 | Voreaux et al. | 60—53 X |

EDGAR W. GEOGHEGAN, *Primary Examiner.*